(12) United States Patent
Mardirossian

(10) Patent No.: US 8,710,789 B2
(45) Date of Patent: Apr. 29, 2014

(54) SYSTEMS AND/OR METHODS FOR USING AIR/WIND POWER TO CHARGE/RE-CHARGE VEHICLE BATTERIES

(75) Inventor: Aris Mardirossian, Potomac, MD (US)

(73) Assignee: Patents Innovations, LLC, Venice, FL (US)

( * ) Notice: Subject to any disclaimer, the term of this patent is extended or adjusted under 35 U.S.C. 154(b) by 1112 days.

(21) Appl. No.: 12/588,173

(22) Filed: Oct. 6, 2009

(65) Prior Publication Data

US 2010/0090643 A1 Apr. 15, 2010

(51) Int. Cl.
*H01M 10/44* (2006.01)

(52) U.S. Cl.
USPC ............ 320/101; 320/104; 415/160; 415/162

(58) Field of Classification Search
USPC .................................... 320/104, 101; 180/2.2
See application file for complete search history.

(56) References Cited

U.S. PATENT DOCUMENTS

| | | | |
|---|---|---|---|
| 4,075,545 A | 2/1978 | Haberer | |
| 4,858,565 A * | 8/1989 | King | 123/41.31 |
| 5,280,827 A | 1/1994 | Taylor et al. | |
| 5,680,032 A | 10/1997 | Pena | |
| 6,105,697 A | 8/2000 | Weaver | |
| 6,638,005 B2 * | 10/2003 | Holter et al. | 415/4.2 |
| 6,857,492 B1 * | 2/2005 | Liskey et al. | 180/165 |
| 6,882,059 B1 | 4/2005 | DePaoli | |
| 6,897,575 B1 | 5/2005 | Yu | |
| 7,135,786 B1 | 11/2006 | Deets | |
| 7,211,905 B1 | 5/2007 | McDavid, Jr. | |
| 7,547,983 B2 | 6/2009 | Sabella | |
| 7,665,554 B1 * | 2/2010 | Walsh | 180/2.2 |
| 2002/0192068 A1 | 12/2002 | Selsam | |
| 2003/0133783 A1 * | 7/2003 | Brock et al. | 415/4.2 |
| 2003/0209370 A1 * | 11/2003 | Maberry | 180/2.2 |
| 2005/0052080 A1 | 3/2005 | Maslov et al. | |
| 2007/0138797 A1 | 6/2007 | Reidy et al. | |

* cited by examiner

*Primary Examiner* — Drew A Dunn
*Assistant Examiner* — Johali Torres Ruiz
(74) *Attorney, Agent, or Firm* — Nixon & Vanderhye P.C.

(57) ABSTRACT

Certain example embodiments of this invention relate to techniques that harness air/wind power to charge and/or re-charge a battery of a vehicle that is at least partially electrically powered. In certain example embodiments, air/wind enters into a channel formed in a vehicle and turns a turbine which, in turn, generates electricity that may be used to charge and/or re-charge a battery of the vehicle. In certain example embodiments, the velocity of the air/wind may be increased within the channel by virtue of features including, for example, retractable and/or directional vanes and/or side wall elements that help create constricting locations (or choke points). In certain example embodiments, the velocity of the air/wind may be increased within the channel by virtue of features that produce the Coanda effect. Thus, for instance, both the Venturi effect and the Coanda effect may be used to increase the efficiency of the overall system.

18 Claims, 5 Drawing Sheets

SYSTEMS AND/OR METHODS FOR USING AIR/WIND POWER TO CHARGE/RE-CHARGE VEHICLE BATTERIES

FIELD OF THE INVENTION

Certain example embodiments of this invention relate to vehicles that are at least partially electrically powered. More particularly, certain example embodiments of this invention relate to techniques that harness air/wind power to charge and/or re-charge a battery of a vehicle that is at least partially electrically powered. In certain example embodiments, air/wind enters into a channel formed in a vehicle and turns a turbine which, in turn, generates electricity that may be used to charge and/or re-charge a battery of the vehicle.

BACKGROUND AND SUMMARY OF EXAMPLE EMBODIMENTS OF THE INVENTION

The need to preserve and protect the environment in which we live has received more and more attention over the past years. For example, many are concerned with the so-called "carbon footprint" problem. In general, the term "carbon footprint" refers to the total set of greenhouse gas (GHG) emissions caused directly and indirectly by an individual, organization, event or product. Carbon footprint typically is reported in the amount of carbon dioxide (or other greenhouse gas) produced. For example, a 2005 study by Vattenfall, a Swedish utility company, calculated that thermal gas technology has a carbon footprint of 1170 g/kWh and combined cycle gas technology has a carbon footprint of 450 g/kWh. At the other end of the spectrum, the same study concluded that wind power technology has a carbon footprint of only about 5.5 g/kWh. The United States Environmental Protection Agency (EPA) has reached similar conclusions. Thus, it will be appreciated that gas technologies are more harmful to the environment, at least in carbon footprint terms, than is wind technology.

Environmental pollution, noise, and depletion of crude oil reserves related to the use of gasoline-powered vehicles continue to be of significant concern. Vehicles that are at least partially electrically powered have come into use in recent years. Such vehicles address some of the problems associated with the gasoline-powered vehicles. However, such vehicles are not yet in widespread use. In addition, improvements to those vehicles that are currently available are still possible. Indeed, it would be advantageous to develop better ways of charging batteries for such vehicles. For instance, it would be desirable to increase the average travel distance between necessary charges, reduce the amount of "down-time" as a vehicle's battery is being recharged, etc. Complicating these factors is the desire to reduce the carbon footprint of the vehicles while providing "cleaner" forms of transportation.

Thus, it will be appreciated that there is a need in the art for systems/methods that overcome these and/or other challenges. For example, it will be appreciated that there is a need in the art for techniques that harness air/wind power to charge and/or re-charge a battery of a vehicle that is at least partially electrically powered.

As one illustrative point of comparison, the GM Volt can travel approximately 230 hours before its gasoline-based backup system engages to recharge the battery. Certain example embodiments may improve upon this performance value.

In certain example embodiments of this invention, a system for charging and/or re-charging a battery in a vehicle is provided. A channel has a body into which wind/air can flow. A plurality of turbines are located in the body of the channel, with each said turbine being rotatable by the wind/air flowing through the channel. A plurality of vanes are located in the body of the channel upstream of the turbines. Constricting locations (also sometimes called choke points) are created between adjacent vanes, the constricting locations (or choke points) being located so as to increase velocity of the wind/air flowing through the channel upstream of the turbines. An electric power subsystem is configured to harness energy generated by the turbines and charge and/or re-charge the battery in the vehicle using the harnessed energy.

In certain example embodiments of this invention, a system for charging and/or re-charging a battery in a vehicle is provided. A channel has a body into which wind/air can flow. At least one turbine is located in the body of the channel, with each said turbine being rotatable by the wind/air flowing through the channel. A plurality of vanes are located in the body of the channel upstream of the at least one turbine. Constricting locations are created between adjacent vanes, with the constricting locations being located so as to increase velocity of the wind/air flowing through the channel upstream of the at least one turbine. An electric power subsystem is configured to harness energy generated by the at least one turbine and charge and/or re-charge the battery in the vehicle using the harnessed energy.

In certain example embodiments of this invention, a duct for a vehicle is provided. A body portion into which wind/air can flow is provided. At least one turbine is located in the body portion, with each said turbine being rotatable by the wind/air flowing through the channel. A plurality of vanes is located in the body of the channel upstream of the at least one turbine. Constricting locations are created between adjacent vanes, with the constricting locations being located so as to increase velocity of the wind/air flowing through the channel proximate to the at least one turbine. The at least one turbine is operably coupled to an electric power subsystem configured to harness energy generated by the at least one turbine.

These example systems/elements may be incorporated into vehicles in certain example embodiments. Additionally, or in the alternative, these example systems/elements may be incorporated into cooling systems, e.g., used in vehicles. Additionally, or in the alternative, methods of making such systems, and vehicles including such systems, also are possible in connection with certain example embodiments.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to techniques that harness air/wind power to charge and/or re-charge a battery of a vehicle that is at least partially electrically powered. In general, as a vehicle moves forward, air/wind enters into a channel. The air/wind proceeds down the channel and turns one or more turbines. The turning of the turbines is used to generate electricity, which may be used to charge and/or re-charge a battery of a vehicle. This behavior, in turn, may generate electricity that may be used to charge and/or re-charge a battery of the vehicle. In certain example embodiments, the velocity of the air/wind may be increased within the channel by virtue of features including, for example, retractable and/or directional vanes and/or side wall elements that help create constricting locations (also sometimes called choke points). In certain example embodiments, the velocity of the air/wind may be increased within the channel by virtue of features that produce the Coanda effect. Thus, for instance, both the Venturi effect and the Coanda effect may be used to increase the efficiency of the overall system. Certain example embodiments relate to a duct provided in a vehicle. The ducts of certain example embodiments include features that accelerate or "speed-up" the wind/air entering into the duct, thereby causing one or more turbines to spin, e.g., in the generation of electricity. In certain example embodiments, the changes in wind/air velocity (e.g., increases in wind/air velocity) may be influenced by corresponding pressure changes (e.g., pressure drops), e.g., produced in accordance with the Bernoulli principle.

As will be appreciated, the strength of wind varies. Indeed, electricity generated from wind power can be variable at different timescales, e.g., from hour-to-hour, daily, seasonally, etc. Because so much power is generated by higher wind speed, much of the energy comes in short bursts. Instantaneous electrical generation and consumption preferably remains in substantial balance, e.g., to help maintain grid stability. This variability may present challenges when attempting to incorporate large amounts of wind power into a grid system. Accordingly, one challenge in wind power generation is how to maintain "wind power density" (WPD), e.g., to account for changing conditions. WPD generally is a calculation of the effective power of the wind at a particular location.

Similar observations as those made above with respect to convention wind power observation also apply with respect to air/wind power used in connection with embodiments of the present invention. Techniques for maintaining an appropriate WPD when travelling in a vehicle at different speeds, encountering different "headwinds," etc., therefore may be applied in connection with certain example embodiments of this invention, e.g., as described in greater example below.

Figure 1:
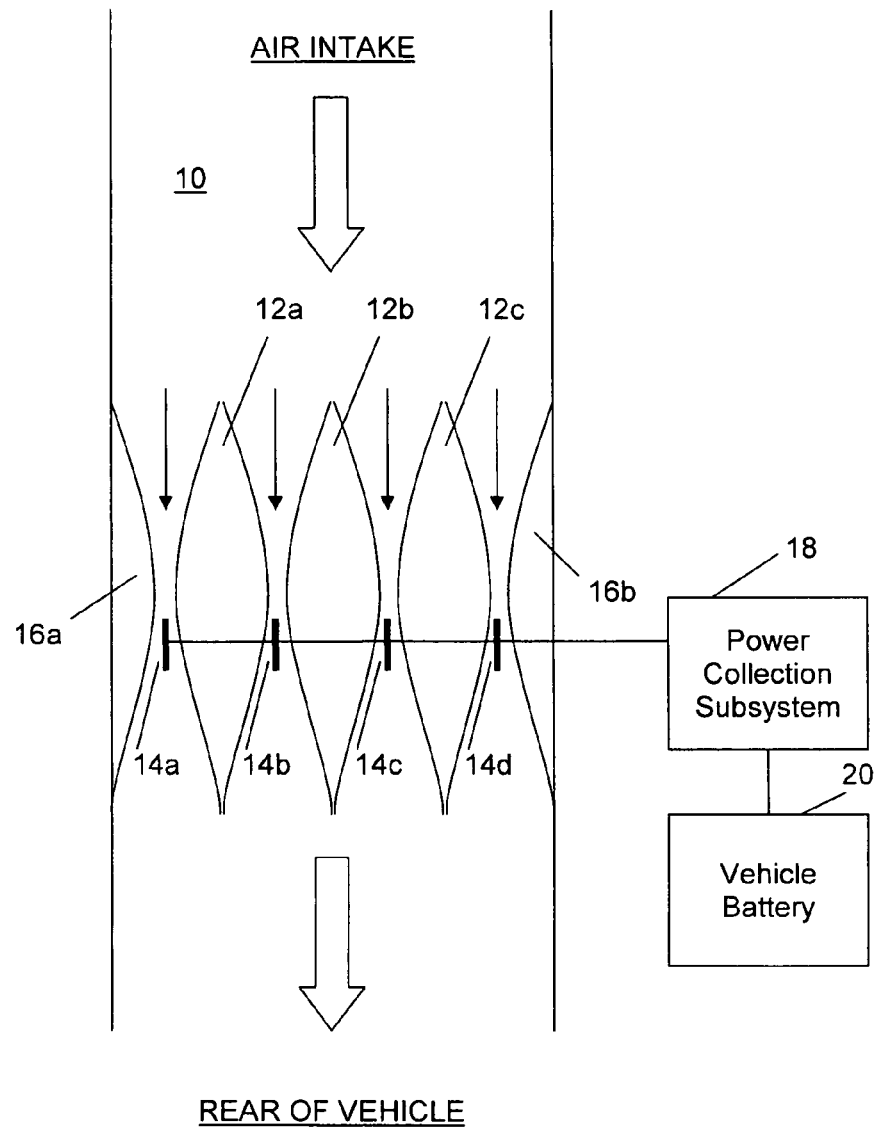
FIG. 1 is a partial schematic view of an air/wind intake channel including a plurality of vanes and turbines for generating electric power in accordance with certain example embodiments.

Referring now more particularly to the drawings, FIG. 1 is a partial schematic view of an air/wind intake channel 10 including a plurality of vanes 12a-c and turbines 14a-d for generating electric power in accordance with certain example embodiments. Because vehicles most frequently move in a generally forward motion (as opposed to a generally rearward motion), air intake may take place towards the front of the vehicle. Thus, most air will flow through the channel 10 towards the rear of the vehicle and past the turbines 14a-d disposed in the body of the channel 10.

Various features may influence the air/wind (e.g., fluids) as they progress through the channel 10 and approaches the turbines 14a-d. FIG. 1, for example, includes vanes 12a-d and features 16a-d. These elements may in certain example implementations be used to help cause the Venturi effect and/or the Bernoulli principle, e.g., in a controllable manner. As is known, the Venturi effect generally relates to the reduction in wind/air/gas (e.g., fluid) pressure that results when a wind/air/gas (e.g., fluid) flows through a constricted section of pipe. The wind/air/gas (e.g., fluid) velocity increases through the constriction to satisfy the equation of continuity, while its pressure decreases because of conservation of energy. That is, the gain in kinetic energy is balanced by a drop in pressure or a pressure gradient force. Similarly, the Bernoulli principle generally states that an increase in the speed of the wind/air/gas (e.g., fluid) occurs simultaneously with a decrease in pressure or a decrease in the wind's/air's/gas's (e.g., fluid's) potential energy for inviscid flows. This is accomplished in the FIG. 1 example by causing the air/wind to be channeled between the elements 16a-b, between the vanes 12, and/or between the elements 16 and the vanes 12. Given this arrangement, which essentially involves choked flows, the velocity of the air/wind will be accelerated as it reaches the vanes 14. Accordingly, the velocity of the air/wind may be increased to a level sufficient to cause rotation of the turbines 14 in example situations where the vehicle is travelling at low speeds.

In certain example embodiments, the vanes 12 and/or the sidewall elements 16a-b may be formed from and/or covered with a smooth material. For example, in certain example instances, a very smooth rubberized material may be used to form such features. Providing a smooth surface may be advantageous in certain example implementations, e.g., to reduce the likelihood of eddy effects being generated, which could sometimes have an impact on the functioning of the turbines, change the characteristics of the constricting locations, alter the pressure gradient(s) produced by the constricting locations, etc. As will be appreciated, such events could negatively impact the performance of the duct, e.g., by reducing the velocity of the wind/air, restricting the potential increase in wind/air velocity, etc. As such, the materials used to form and/or cover the vanes 12 and/or the sidewall elements 16a-b may be selected so as to reduce the presence of such eddy effects. Certain example embodiments thus may provide this improvement and/or reduce the likelihood of drawbacks when attempting to increase the velocity of the wind/air entering into the channel/duct by altering pressure characteristics, e.g., in accordance with the Bernoulli principle.

Although the vanes 12 shown in FIG. 1 are substantially tear-drop shaped, over arrangements may be used in certain example embodiments. For example, more or less ovular shapes may be used. In general, the vanes may be of any size and/or shape, provided that constricting locations (or choke points) are created, in certain example embodiments. Furthermore, although the elements 16a and 16b are shown as being "one-half" of a single vane 12, they too may be differently sized and/or shaped. The shapes of the side wall elements 16a and 16b may be similar to one-half of a single vane, or they may be provided as differently shaped elements.

As will be appreciated from the description provided above, maintaining WPD during changing conditions would be advantageous. This may involve the vehicle temporarily encountering strong headwinds, travelling through traffic at different speeds, etc. To help maintain WPD, some or all of the vanes 12, turbines 14, and/or features 16 may be made directional and/or retractable. For instance, when the vehicle is travelling at a very high speed, some or all of the vanes 12 may retract, since the air/wind entering into the channel 10 will already be at a sufficient velocity to produce the desired rotation of the turbines 14. Similarly, when the vehicle is travelling at a very low speed, some or all of the vanes 12 may be engaged such that the velocity of the air/wind entering into the channel 10 is increased, e.g., as a result of the above-described and/or other effects. Similarly, some or all of the may rotated or otherwise moved so that their respective constricting locations (choke points) are closed. A control system operably connected to the components may coordinate these retracting and/or redirecting actions of the vanes based on the prevailing, changing, and/or other conditions.

In certain example embodiments, the vanes 12, turbines 14, and/or features 16 may be mechanically raised, lowered, or rotated so as to accomplish the desired effect, e.g., when certain conditions are met. Such a system may be operably connected to the vehicle's speedometer, for example. In this way, when the vehicle moves above or below certain threshold speeds, the vanes and/or other features may be selectively deployed. In certain example embodiments, all vanes may be activated when the vehicle is travelling lower than 10 mph, vane 12a may be deactivated when the vehicle is travelling at 10-35 mph, vane 12b may be deactivated when the vehicle is travelling at 35-60 mph, and vane 12c may be deactivated when the vehicle is travelling at 60-80 mph. Of course, other thresholds may be established for this and/or other configurations where more or fewer vanes are implemented with or without side wall features 16a-b. In certain example embodiments, if the vehicle is traveling at a speed that it too fast and might damage the turbines and/or internal system components, the channel/duct may be blocked and/or the components therein may be at least temporarily selectively deactivated.

Adjustments also may be made by measuring air/wind speed proximate to the turbines. If a suitable velocity is not obtained, the deployment of the vanes may be adjusted accordingly. Similarly, in addition or in the alternative, electricity production also may be measured and, if too high or too low, the deployment of the vanes also may be adjusted accordingly. In certain example embodiments, comparisons may be made between, for example, an input value such as, for example, air/wind velocity proximate to the air intake, vehicle speed, etc., and an output value such as, for example, air/wind velocity proximate to the turbines, power collection, etc. This data may be fed back into a computer and used to dynamically adjust the thresholds at which the various vanes are implemented, e.g., so that the overall system "learns" over time.

Furthermore, rather than making "real-time" or substantially real-time changes, the adjustments may be made based on measurements made of a predefined amount of time. For example, in certain example embodiments, the adjustments may be made based on measurements made over a 5 minute, 10 minute, 30 minute, or other time interval. The vanes may be set based on an average speed, median speed, minimum or maximum speed, etc., of the vehicle and/or the air/wind entering into the channel.

In certain example embodiments, the speed of the wind/air may be measured directly or indirectly. For example, in certain example embodiments, pressure sensors may be provided. The output from such pressure sensors may be used to calculate and/or infer the velocity of the wind/air, changes in velocity of the wind/air (e.g., upstream of, at or proximate to, and/or downstream of the constricting locations), etc. This information also may be used to selectively alter the characteristics of the enabled constricting location(s). For instance, as explained above, vanes may be selectively deployed to create one or more constricting locations, the size(s) of the constricting location(s) may be adjusted (e.g., by moving, rotating, removing, or otherwise altering the positioning of the vanes), etc. In certain example embodiments, the blades themselves may be temporarily fixed in dependence on such calculations, e.g., so that they do not turn when it is inappropriate to do so. For example, the turbine blades may selectively open/close. It will be appreciated that programmed logic circuitry may be provided so as to perform such calculations and/or direct the components to move accordingly. Such programmed logic circuitry may include a program stored on a computer-readable storage medium.

As alluded to above, the number of turbines, the number of vanes, and the presence of side wall features may be variable or optional in different example embodiments. Thus, for example, although the FIG. 1 example embodiment shows three vanes and four turbines, different example embodiments may use different numbers of vanes and/or turbines. In generally, example embodiments of this invention may function provided that there is at least one channel through without air may reach at least one turbine. Additionally, the number of smaller channels between features (represented by the thin arrows in FIG. 1) need not be in a one-to-one ration with the turbines. Moreover, although the turbines shown in FIG. 1 are shown as being located between but towards the rear ends of the vanes, other placements also are possible. For example, the turbines may be located "behind" the vanes, at the very back(s) of the vanes, closer to the center(s) of the vanes, etc. Furthermore, the vanes and turbines do not need to be vertically aligned with one another. For example, in certain example embodiments, such elements may be staggered front-to-back and/or side-to-side, e.g., so as to achieve a desired air/wind flow effect.

The rotation of the turbines 14 may be used to generate electricity. In this regard, the turbines 14 may be connected to a power collection subsystem 18. This power collection subsystem 18 may, in turn, be electrically connected to a battery of the vehicle 20, e.g., so as to charge and/or re-charge it. Advantageously, this may prolong the travel distance of the vehicle and/or reduce the amount of "lag-time" involved in charging (e.g., because the battery will not be as drained). The power collection subsystem 18 may include induction generators, solid-state converters between the turbine generator and the collector system, and/or the like.

In certain example embodiments, the subsystem 18 may include circuitry (e.g., including capacitors and/or resistors) to regulate the current of the electricity produced. This may increase the overall usability of the electricity and account for variations in current resulting from, for example, changes in vehicle speed, amount of air/wind being processed, partial or complete failure of some or all of the turbines, etc.

One or more additional batteries also may be provided, e.g., between the power collection subsystem 18 and the vehicle battery 20. These additional batteries may be useful, for example, at low levels of air/wind penetration. They also may be used to compensate for fluctuations in load caused by any number of factors including, for example, rapid changes in vehicle speed, prevailing headwind, etc. For instance, additional batteries may be used to store energy when the primary vehicle battery 20 is already full. Similarly, additional batteries may be used when an insufficient amount of power is being generated by the turbines (e.g., when the vehicle is stuck in traffic, etc.).

In certain example embodiments, the air/wind power may be supplemented or even replaced by other power stations when necessary or desirable. For instance, optional solar collectors provided to the vehicle may be used when the vehicle is substantially stationary or moving.

In certain example embodiments, a filter may be provided at the front of the channel or outside the front of the channel. Such a filter may reduce the likelihood of debris (e.g., trash, dirt, gravel, and/or the like) from entering into the channel. In certain example embodiments, the filter may be provided at or on the grille of a car. In certain example embodiments, a check valve may be provided at the rear of the channel. The check valve may reduce the likelihood of air entering into the channel in the wrong direction, e.g., when the vehicle is traveling in reverse.

Figure 2:
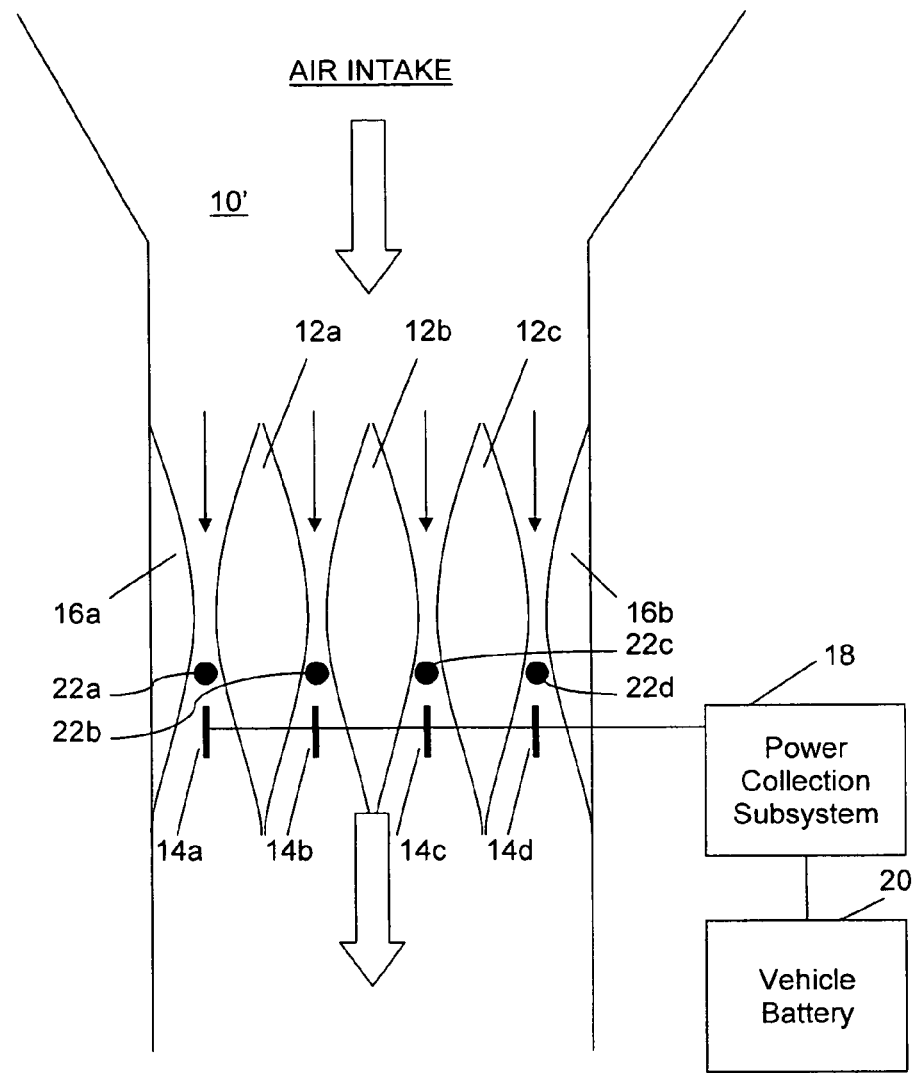
FIG. 2 is a partial schematic view of another air/wind intake channel including a plurality of vanes and turbines for generating electric power in accordance with certain example embodiments.

FIG. 2 is a partial schematic view of another air/wind intake channel 10' including a plurality of vanes 12a-c and turbines 14a-d for generating electric power in accordance with certain example embodiments. The FIG. 2 example embodiment is similar to the FIG. 1 example embodiment. However, several modifications have been made to the FIG. 2 example embodiment that may be used to further increase the efficiency of the wind collection system. In particular, the channel 10' in FIG. 2 is wider proximate to the air intake and becomes tapered towards the vanes 12a-c. This may provide a first stage of air/wind acceleration prior to the second stage of acceleration at the vanes 12.

The FIG. 2 example embodiment also includes a plurality of generally columnar components 22a-d. These generally columnar components 22a-d may be used further increase the velocity of the air/wind by virtue of the Coanda effect. The Coanda effect generally refers to the tendency of a wind/air/gas (e.g., fluid) jet to be attracted to a nearby surface. The bending of the flow results in its acceleration and, as a result of Bernoulli's principle, pressure is decreased. Thus, the incorporation of components 22a-d may be used to further increase the velocity of the air/wind.

As above, the elements 22a-d may be made retractable and/or movable. Furthermore, any number of elements may be present in different example embodiments of this invention. For example, as shown in FIG. 2, elements 22a-d are located past the constricting locations (or choke points) caused by the vanes and before the turbines 14a-d. However, these elements may be moved up towards, in, or in front of the constricting locations (or choke points). In certain example embodiments more or fewer elements may be implemented. In certain example embodiments, a single Coanda effect producing element may be located upstream of the vanes.

The channel may be placed in any number of locations of the vehicle. For example, in automobile applications, the channel may be placed at any location where it may receive air/wind as the automobile travels. In certain example embodiments, it may be at least partially obscured from the general appearance, e.g., by being placed behind the vehicle grille, below the front bumper, etc. In certain example embodiments, the channel may be incorporated into an aesthetic feature of the vehicle. For example, the channel may be placed in the hood of the vehicle, in the grille, proximate to an engine protruding through the hood of a car, along the window frame or A-pillar, or elsewhere, in a more conspicuous manner. The placement may be similar for an airplane or boat, recognizing, or course, that the channel may impact the overall aerodynamics of the airplane and that the channel may take on water if its placement in a boat is not appropriately selected. Of course, in the latter example, a combination wind and/or hydroelectric system may be possible in certain example embodiments, wherein the same principles apply as between the fluid being air/wind and water.

In certain example embodiments, the channel may feed into the normal exhaust line of the vehicle. In certain example embodiments, the channel may feed into one or more separate lines so that the air/wind may be vented out of the vehicle. For instance, in certain example embodiments, such lines may vent to the back of the car, e.g., so as to appear as a normal exhaust pipe. Such lines also may vent towards the ground, e.g., underneath the vehicle, in certain example embodiments. In still other example embodiments, such lines may be curved and vent to the side of the car or even the front of the car (e.g., to the grille).

In certain example embodiments, the wind/air may be routed to the rear of the vehicle so that it helps disrupt the vacuum formed at the rear thereof. In certain example embodiments, the wind/air may be discharged at one or more locations (e.g., above the bumper, below the bumper, near the trunk, etc.) so as to reduce the size and/or influence of the vacuum formed at the rear of the vehicle as it travels. In some instances, the vacuum may even be destroyed. It will be appreciated that discharging the wind/air in this way may lead to an improvement in the overall aerodynamics of the vehicle.

Figure 3A:
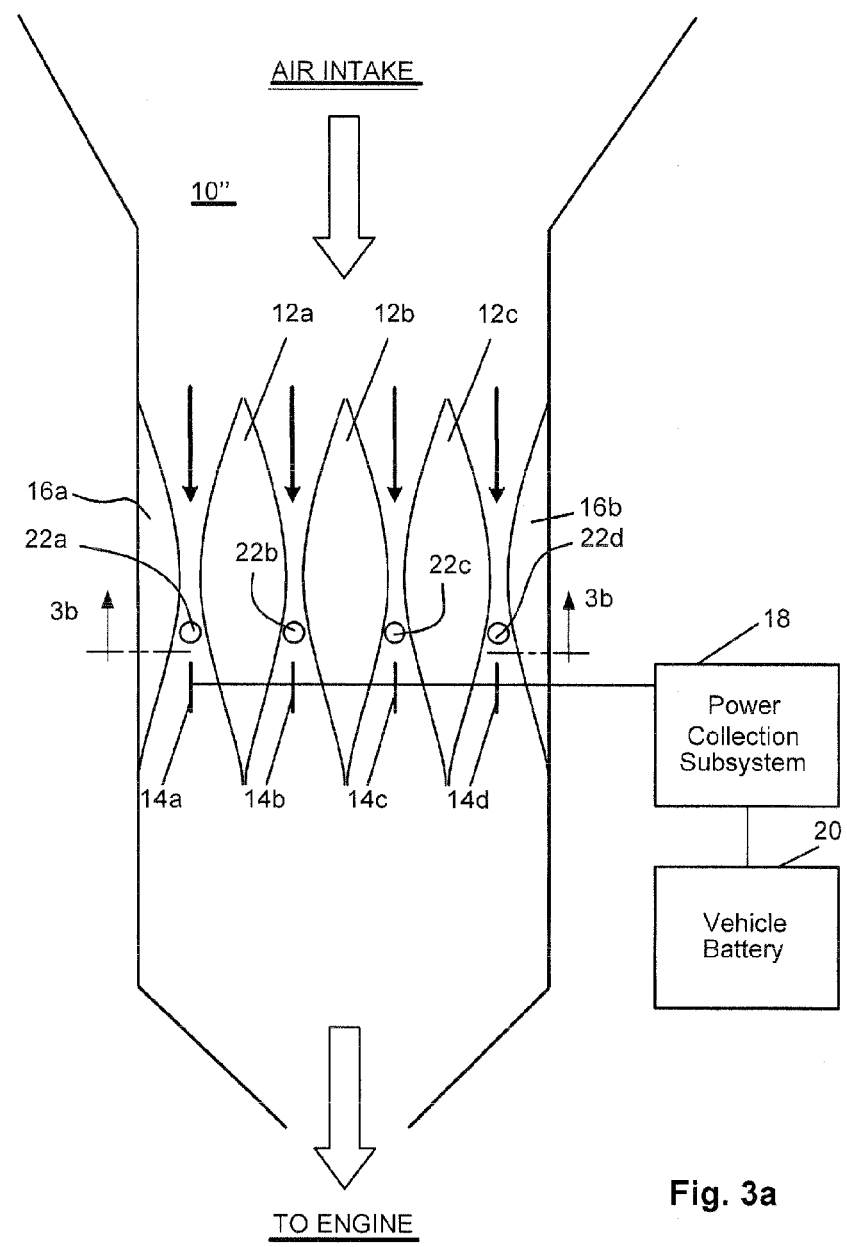
FIG. 3a is a partial schematic view of still another air/wind intake channel including a plurality of vanes and turbines for generating electric power in accordance with certain example embodiments.
Figure 3B:
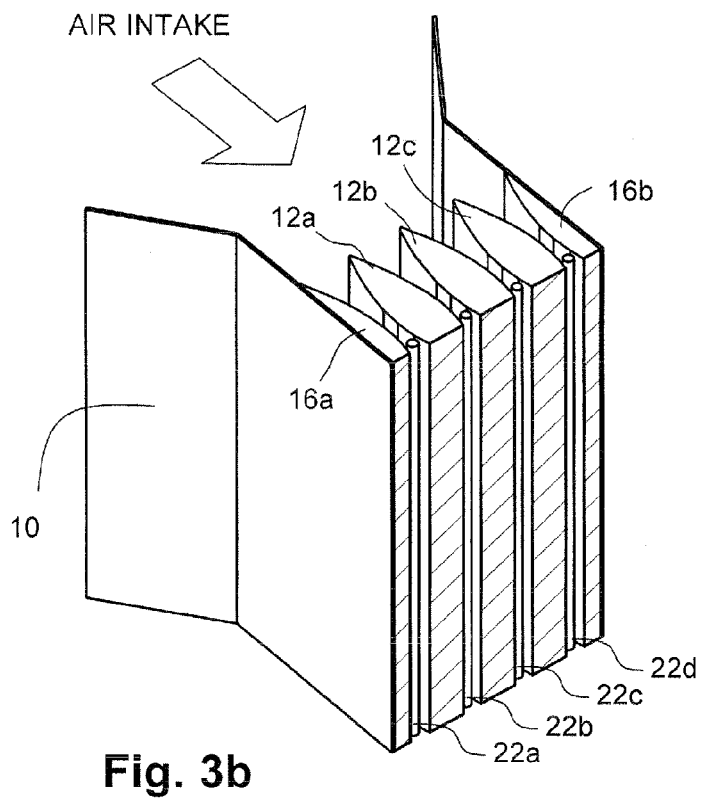
FIG. 3b is a partial perspective view of an example embodiment as taken through the section line of the FIG. 3a example.
Figure 3C:
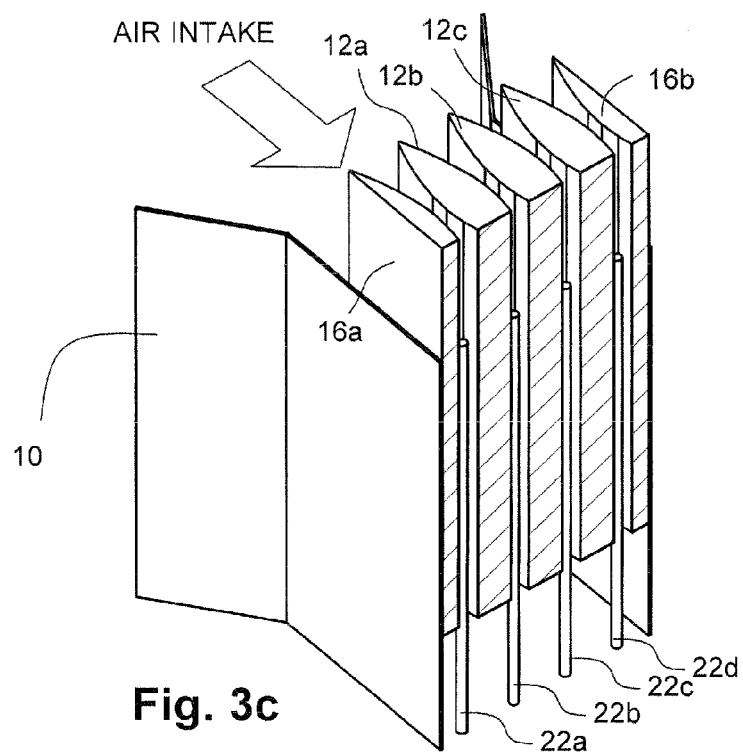
FIG. 3c shows the vanes of FIG. 3b being partially retracted in accordance with certain example embodiments.

FIG. 3 is a partial schematic view of still another air/wind intake channel 10" including a plurality of vanes 12a-c and turbines 14a-d for generating electric power in accordance with certain example embodiments. The FIG. 3 example embodiment is similar to the FIG. 2 example embodiment. However, the channel 10" is tapered towards its rear portions. This may be useful when connecting the channel 10" to an input in the vehicle's engine. Causing the channel 10" to vent in this way may be advantageous in certain example embodiments, in that it may be used to increase the efficiency and/or performance of the engine. For instance, the arrangement shown in FIG. 3 may be used to turbo-charge an engine. In this regard, the channel as a whole may be substantially in-line with the engine in certain example embodiments.

In certain example embodiments, in addition or as an alternative, the wind/air may be directed and/or redirected as or after it exits the channel so that it functions as a part of a cooling system. For example, in certain example embodiments, the channel may direct the wind/air so that it flows proximate to internal components of the vehicle. Internal components such as, for example, vehicle batteries, engines, and/or the like, may be cooled by providing a flow of wind/air (either accelerated or not accelerated) over, around, or near such components.

Figure 4:
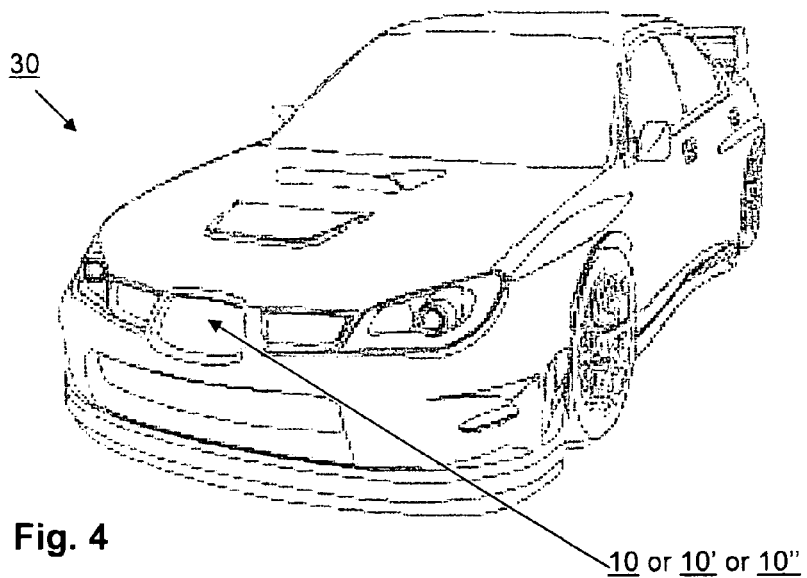
FIG. 4 is a partial perspective view of an example vehicle incorporating the electric power generating techniques of certain example embodiments.

FIG. 4 is a partial perspective view of an example vehicle incorporating the electric power generating techniques of certain example embodiments. The FIG. 4 example embodiment is a car 30, which includes a channel 10 or 10' or 10" or the like. The channel in the FIG. 4 embodiment is located behind the grille of the vehicle 30, e.g., so as to be at least partially concealed. Of course, as explained in greater detail above, the channel may be located in this or any other suitable position.

Although the vehicle shown in the FIG. 4 embodiment is a particular car model, the techniques described herein may be used in connection with any other type of vehicle. For example, the techniques described herein may be used in connection with other automobiles, motorcycles, tractors, airplanes, boats, and/or the like. Such vehicles may be wholly or partially electrically powered. This includes, for example, electrically powered vehicles, hybrid vehicles, etc.

Methods of making the systems and/or vehicles also may be provided by certain example embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for charging and/or re-charging a battery in a vehicle, comprising:
    a channel having a body into which wind/air can flow;
    a plurality of turbines located in the body of the channel, each said turbine being rotatable by the wind/air flowing through the channel;
    a plurality of vanes located in the body of the channel upstream of the turbines, wherein constricting locations are created between adjacent vanes, the constricting locations being located so as to increase velocity of the wind/air flowing through the channel upstream of the turbines, wherein the turbines are retractable;
    a computer-based control system configured to cause the each of said vanes to retract when the vehicle reaches a predetermined speed threshold associated with the vanes; and
    an electric power subsystem configured to harness energy generated by the turbines and charge and/or re-charge the battery in the vehicle using the harnessed energy.

2. The system of claim 1, further comprising a feature mounted to the side wall of the channel substantially in line with the plurality of vanes.

3. The system of claim 1, further comprising at least one substantially columnar feature located in the channel so as to increase velocity of the wind/air flowing through the channel upstream of the turbines.

4. The system of claim 3, wherein the at least one substantially columnar feature is located upstream of the plurality of vanes.

5. The system of claim 3, further comprising a plurality of substantially columnar features.

6. The system of claim 3, wherein each said substantially columnar feature is located downstream of the chokepoints created by the vanes.

7. The system of claim 1, further comprising circuitry configured to regulate current of harnessed energy.

8. The system of claim 7, further comprising a plurality of backup batteries configured to temporarily store the harnessed energy.

9. A vehicle comprising the system of claim 1.

10. The vehicle of claim 9, wherein the channel vents into the tailpipe.

11. The vehicle of claim 9, wherein the channel is connected to the engine such that the wind/air exits the channel and is fed into the engine.

12. The vehicle of claim 9, wherein the channel is located behind a front grille of the vehicle.

13. A system for charging and/or re-charging a battery in a vehicle, comprising:
    a channel having a body into which wind/air can flow;
    at least one turbine located in the body of the channel, each said turbine being rotatable by the wind/air flowing through the channel;
    a plurality of vanes located in the body of the channel upstream of the turbines, wherein constricting locations are created between adjacent vanes, the constricting locations being located so as to increase velocity of the wind/air flowing through the channel upstream of the turbines, wherein the turbines are retractable;
    a computer-based control system configured to cause the each of said vanes to retract when the vehicle reaches a predetermined speed threshold associated with the vanes; and
    an electric power subsystem configured to harness energy generated by the turbines and charge and/or re-charge the battery in the vehicle using the harnessed energy.

14. The system of claim 13, further comprising at least one substantially columnar feature located in the channel so as to increase velocity of the wind/air flowing through the channel upstream of the turbines.

15. The system of claim 13, further comprising a plurality of backup batteries configured to temporarily store the harnessed energy.

16. The system of claim 13, wherein the channel is disposed in the vehicle so that wind/air exiting therefrom flows to an area proximate to the battery such that, in operation, the battery is cooled via the wind/air.

17. A vehicle comprising the system of claim 13.

18. A method of making a system for charging and/or re-charging a battery in a vehicle, the method comprising:
    providing a channel having a body into which wind/air can flow;
    providing a plurality of turbines in the body of the channel, each said turbine being rotatable by the wind/air flowing through the channel;
    providing a plurality of vanes located in the body of the channel upstream of the turbines, wherein constricting locations are created between adjacent vanes, the constricting locations being located so as to increase velocity of the wind/air flowing through the channel upstream of the turbines as the vehicle moves, wherein the turbines are retractable;
    providing a computer-based control system configured to cause the each of said vanes to retract when the vehicle reaches a predetermined speed threshold associated with the vanes; and
    providing an electric power subsystem configured to harness energy generated by the turbines and charge and/or re-charge the battery in the vehicle using the harnessed energy as the vehicle moves.

* * * * *